Figure 3:
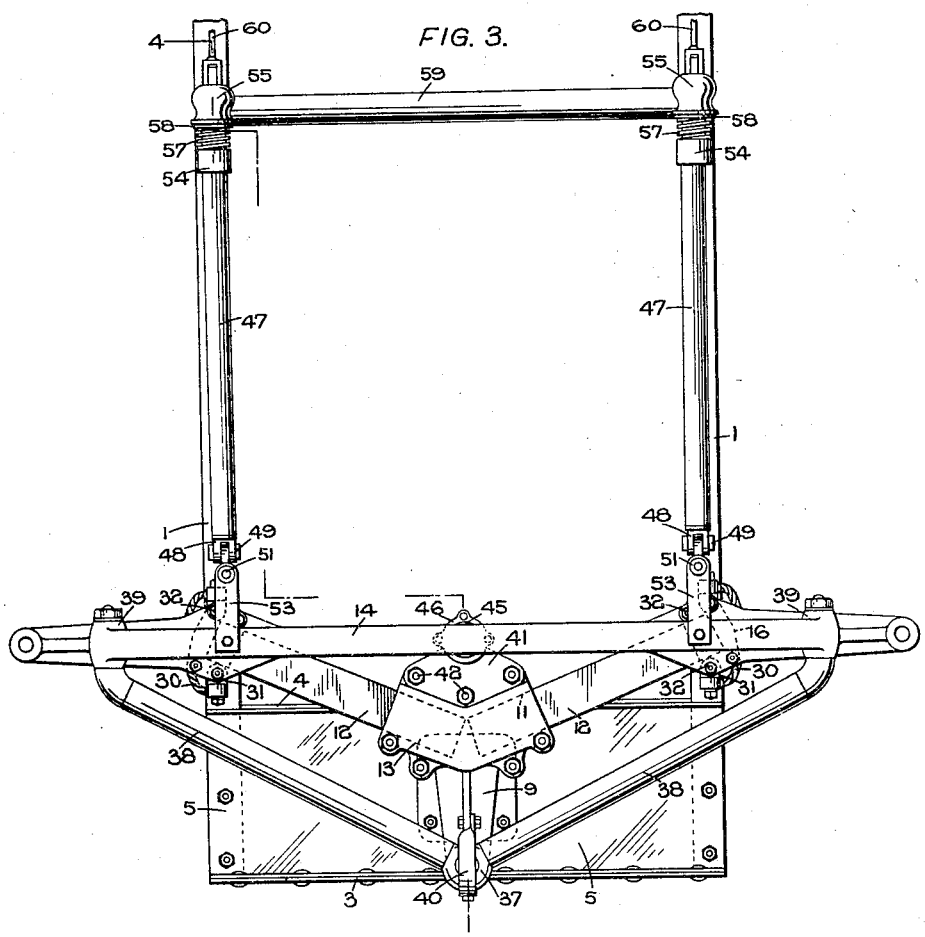

March 24, 1931.                H. GARNER                 1,798,077
                SUSPENSION MEANS FOR MOTOR ROAD VEHICLES
                  Filed July 17, 1929          2 Sheets-Sheet 1
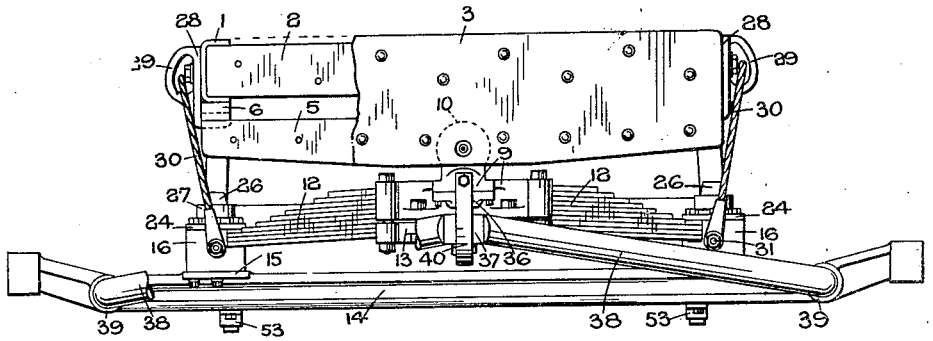
FIG. 1.
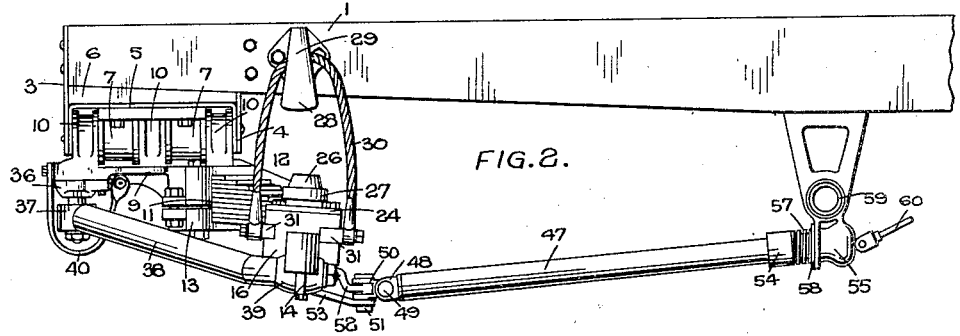
FIG. 2.
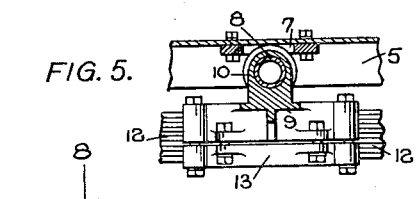
FIG. 5.
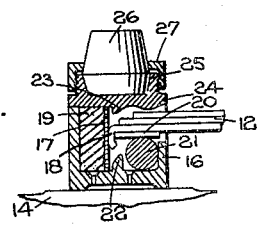
FIG. 6.
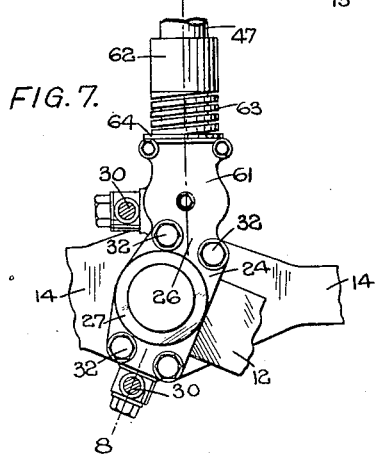
FIG. 7.
FIG. 8.
INVENTOR
*Henry Garner*
BY
ATTORNEYS March 24, 1931.  H. GARNER  1,798,077

SUSPENSION MEANS FOR MOTOR ROAD VEHICLES

Filed July 17, 1929  2 Sheets-Sheet 2

INVENTOR
*Henry Garner*
BY
ATTORNEYS

Patented Mar. 24, 1931

1,798,077

UNITED STATES PATENT OFFICE

HENRY GARNER, OF MOSELEY, BIRMINGHAM, ENGLAND

SUSPENSION MEANS FOR MOTOR ROAD VEHICLES

Application filed July 17, 1929, Serial No. 379,024, and in Great Britain July 17, 1928.

This invention relates to suspension means for motor road vehicles and refers more particularly to that type of suspension wherein the spring connection between the front axle and the frame is placed substantially on the longitudinal centre line of the frame so that the axle can rock about an axis disposed substantially on the longitudinal centre line of the vehicle.

In vehicles having this kind of front suspension it has hitherto been the common practice to arrange the front axle in advance of the normal position, i. e. the position occupied by the front axle when half elliptical springs are used at the sides of the frame, the advancing of the front axle having been found desirable in order to obtain the necessary clearance for the various moving parts.

It is one of the primary objects of the present invention to provide a suspension of the type referred to but to arrange that the axle shall occupy its normal position so as to obtain a shorter wheel base than has hitherto been possible with the type of suspension to which this invention relates.

In connection with the attaining of a shorter wheel base than hitherto it may be pointed out that this has advantages which are well known, i. e. the vehicle has a smaller turning circle and greater clearance is obtained over road obstructions then with a longer wheel base.

The present invention is therefore particularly applicable to vehicles intended for use upon unmade roads or rough ground such for instance as military vehicles or vehicles for use in undeveloped countries.

A further object of the present invention is to provide improved means for retaining the axle in a plane which is a right angles to the longitudinal centre line of the vehicle such means being applicable either to vehicles wherein a transverse spring (or springs) is used which is placed directly above the axle or to the special arrangement herein described which includes obliquely arranged springs.

In vehicles where the front springing is substantially transverse or oblique the springs are not well placed for absorbing the shocks received on the front axle due to the front wheels striking obstructions, and a further object of the present invention is to provide means to relieve the springs of such shocks.

Referring to the drawings:—

Figure 4:
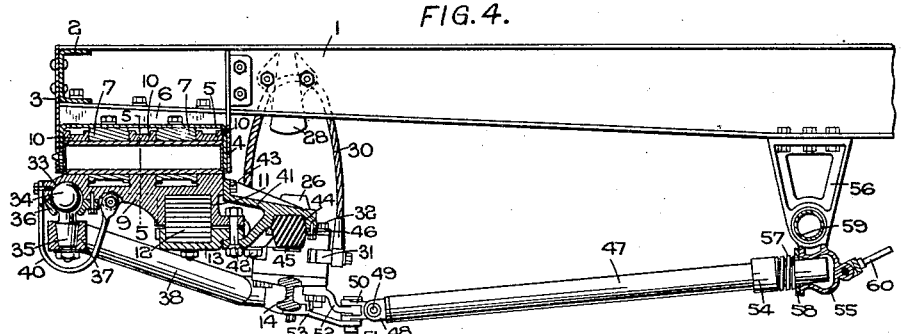

Figure 1 is a front view with a part of the front plate broken away.
Figure 2 is a side view.
Figure 3 is a plan view.
Figure 4 is a section on line 4—4 of Figure 3.
Figure 5 is a section on line 5—5 of Figure 4.
Figure 6 is a detail view.
Figure 7 is a fragmental plan view.
Figure 8 is a section on line 8—8 of Figure 7.

In the construction illustrated the longitudinal frame members 1 of the vehicles are connected at their forward ends by a transverse frame member 2.

Extending transversely across the front of the frame are a pair of spaced plates 3, 4 between which a channel section girder 5 is fixed, blocks 6 being interposed between the top of this girder at its ends and the under side of the frame members 1.

Secured to the girder 5 are a pair of spaced blocks 7 carrying a hollow pivot pin 8 and on this pivot pin is mounted a swinging bracket 9 the bracket having three lugs 10 which engage the hollow pin 8.

The rearward end of the bracket 9 is formed with housings 11 for the inner ends of laminated springs 12, these springs being fixed to the bracket by caps 13.

The springs extend rearwardly and in diverging relationship to the front axle 14 of the vehicle.

Near its outer ends the front axle 14 is provided with flanges 15 and each of these flanges carries a box 16 which may be bolted to the flange 15, the boxes 16 receiving the outer ends of the springs 12.

As will be seen from Figure 5 each box contains a rubber or other elastic buffer 17 and the main plate of each spring is bent downwardly as shown at 18 a rubbing plate 19 being interposed between the end of the spring and the buffer 17.

On its under side and at its outer end each spring is provided with a rubbing plate 20 which engages a loose roller 21 in the box 16, movement of the roller being limited by a projection 22 within the box.

The elastic buffer 17 and plate 19 are retained in position by the projection 22 and a projection 23 on the cover plate 24 of the box.

The cover plate 24 is provided with a boss 25 into which is placed a rubber or other elastic buffer block 26 retained in position by a screwed cap 27. The blocks 26 serve as stops to limit relative movement between the axle and the frame of the vehicle, the block being adapted to come into contact with the under side of brackets 28 secured on the longitudinal frame members 1 of the vehicle.

The brackets 28 may include loops 29 connected by cables 30 to laterally projecting eye bolts 31 on the boxes 16, the eye bolts 31 being retained in position by the bolts 32 which are employed to secure the covers 24.

The cables 30 may serve also to limit relative rocking movement between the axle and the vehicle frame.

The bracket 9 at its forward end is provided with a seating 33 for the ball 34 of a ball arm 35, the ball 34 being retained in position by a cover plate 36.

The arm 35 can swing in any direction relatively to the bracket 9 while the bracket 9 can swing laterally on the pin 8.

On the arm 35 is mounted a swivel block 37 to which are attached the forward ends of two radius rods 38.

The radius rods extend rearwardly from the block 37 in diverging relationship and have their rearward ends connected to bosses 39 formed on the front axle near its ends.

If required, a strap 40 may be provided on the bracket 9 extending under the block 37.

To the rear of the bracket 9 is fixed a bracket 41 this bracket being attached by a bolt 42 to the plate 13 and to the bracket 39 and also being attached by the bolt 43 directly to the rear face of the bracket 9.

The bracket 41 has a housing 44 carrying a rubber or other elastic buffer 45 retained in position by a plate 46 this buffer 45 being disposed over the centre of the axle 14 and thus serving as a stop to limit upward movement of the axle.

In order to reinforce the springs and axle against shocks such as are experienced when the front wheels strike road obstructions buffers 47 are provided. These buffers are shown clearly in Figures 2, 3 and 4.

Referring particularly to Figure 3 the buffer 47 consists of a tube attached at its forward end by a fork 48 pivoted on a pin 49 carried by a swivel fork 50. The swivel fork 50 is pivoted on a pin 51 carried by brackets 52 and 53, the latter being attached to the axle. The bracket 52 is attached to one of the flanges 15.

At its rear end the buffer tube 47 is provided with a collar 54 and to the rear of the collar the buffer tube enters a housing 55 formed on the bracket 56 bolted to the frame.

A strong spring 57 is interposed between the collar 54 and a plate 58 adjacent the housing 55.

The two brackets 56, one at each side of the frame, are connected by a transverse tube 59 and each bracket may be provided with an inclined rear stay 60.

Instead of connecting the forward ends of the buffer tubes 47 in the manner described above they may be supported in the manner illustrated in Figures 7 and 8 wherein the boxes 16 are each provided with a rearwardly extending socket 61 which receives the forward end of one of the buffer tubes 47, the buffer tube being provided with an external collar 62 and a strong spring 63 acting between the collar 62 and a plate 64 bearing on the end of the socket 61.

It will be observed that the housing 55 and the socket 61 have flared mouths so as to allow of a certain angular movement of the buffer tubes 47.

In operation the arrangement permits a short wheel base to be obtained while allowing the necessary clearance for the crank case of the engine. Further, the arrangement allows the front wheels to move or articulate relatively to the vehicle frame and independently of each other while the radius rods 38 keep the front axle in a plane which is at right angles to the longitudinal center line of the vehicle and, moreover, as the torque rods can swing from side to side in unison with the springs they effect this without placing undue stresses upon the springs or other working parts.

I wish it understood that various changes in form, proportions and minor details of construction may be resorted to within the scope of the appended claims, and that I do not wish to limit myself to the specific design and construction here shown.

What I claim then is:—

1. Front suspension means for road vehicles comprising in combination, a bracket pivotally associated with the front part of the vehicle frame, the axis of the pivot being disposed substantially on the longitudinal center line of the vehicle, a front axle disposed at the rear of said bracket and springs extending rearwardly and obliquely from said bracket to said axle.

2. Front suspension means for road vehicles comprising in combination, a bracket pivotally associated with the front part of the vehicle frame, the axis of the pivot being disposed substantially on the longitudinal center line of the vehicle, a front axle disposed at the rear of said bracket, springs extending rearwardly and obliquely from said bracket to said axle, a ball arm mounted in said bracket for lateral swinging movement, and radius rods associated with the axle near its ends and connected to said link.

3. Front suspension means for road vehicles comprising in combination, a bracket pivotally associated with the front part of the vehicle frame, the axis of the pivot being disposed substantially on the longitudinal center line of the vehicle, housings on the rear part of the bracket for the ends of a pair of springs, a link mounted for lateral swinging movement on the forward part of said bracket, a front axle disposed at the rear of said bracket, springs engaging said housings and connected to the axle, and radius rods associated with the axle near its ends and connected to said ball arm.

4. Front suspension means for road vehicles comprising in combination, a transverse girder at the forward end of the vehicle frame, blocks on said girder, a pivot pin carried by said blocks, a bracket on said pivot pin, the axis of the pivot being disposed substantially on the longitudinal center line of the vehicle, a front axle disposed at the rear of said bracket and springs extending rearwardly and obliquely from said bracket to said axle.

5. Front suspension means for road vehicles comprising in combination, a bracket pivotally associated with the front part of the vehicle frame, the axis of the pivot being disposed substantially on the longitudinal center line of the vehicle, a ball arm jointed to said bracket, a swivel block on said link, a front axle disposed at the rear of said bracket, springs extending rearwardly and obliquely from said bracket to said axle and radius rods connected to said swivel block and to said axle.

6. Front suspension means for road vehicles comprising in combination, a bracket pivotally associated with the front part of the vehicle frame, the axis of the pivot being disposed substantially on the longitudinal center line of the vehicle, a buffer bracket, on the rear end of said bracket a buffer block in said buffer bracket, a front axle disposed at the rear of said bracket, and spring connections extending from the bracket to the axle, said buffer block being disposed above the axle.

7. Front suspension means for road vehicles comprising in combination, a bracket pivotally associated with the front part of the vehicle frame, the axis of the pivot being disposed substantially on the longitudinal center line of the vehicle, a front axle disposed at the rear of said bracket, boxes on said axle, housings in said boxes, and springs extending rearwardly and obliquely from said bracket to said axle the outer ends of said springs engaging in said housings.

8. Front suspension means for road vehicles comprising in combination, a bracket pivotally associated with the front part of the vehicle frame, the axis of the pivot being disposed substantially on the longitudinal center line of the vehicle, a front axle disposed at the rear of said bracket, boxes on said axle, housings in said boxes, rollers in said housings, and springs extending rearwardly and obliquely from said bracket to said axle, the outer ends of said springs engaging said rollers.

9. Front suspension means for road vehicles comprising in combination, a bracket pivotally associated with the front part of the vehicle frame, the axis of the pivot being disposed substantially on the longitudinal center line of the vehicle, a front axle disposed at the rear of said bracket, and springs extending rearwardly and obliquely from said bracket to said axle, buffer rods extending rearwardly from the outer ends of said axle, and buffer brackets on the frame, the buffer rods engaging said buffer brackets.

10. Front suspension means for road vehicles comprising in combination, a bracket pivotally associated with the front part of the vehicle frame, the axis of the pivot being disposed substantially on the longitudinal center line of the vehicle, a front axle disposed at the rear of said bracket, and springs extending rearwardly and obliquely from said bracket to said axle, buffer rods extending rearwardly from the outer end of said axle, a transverse member connecting the rear parts of said rods, and buffer brackets on the frame, the buffer rods engaging said buffer brackets.

11. Front suspension means for road vehicles comprising in combination, a bracket pivotally associated with the front part of the vehicle frame, the axis of the pivot being disposed substantially on the longitudinal center line of the vehicle, a front axle disposed at the rear of said bracket, boxes on said axle, sockets in said boxes, buffer rods having their ends engaging in said sockets, and buffer brackets on the frame, the buffer rods engaging said buffer brackets.

In witness whereof, I affix my signature.

HENRY GARNER.